(12) United States Patent
Johnson

(10) Patent No.: US 8,568,921 B1
(45) Date of Patent: Oct. 29, 2013

(54) REGENERATIVE ION EXCHANGE FUEL CELL

(75) Inventor: Lonnie G. Johnson, Atlanta, GA (US)

(73) Assignee: Excellatron Solid State LLC, Atlanta, GA (US)

( * ) Notice: Subject to any disclaimer, the term of this patent is extended or adjusted under 35 U.S.C. 154(b) by 1991 days.

(21) Appl. No.: 11/206,454

(22) Filed: Aug. 18, 2005

Related U.S. Application Data

(60) Provisional application No. 60/602,579, filed on Aug. 18, 2004.

(51) Int. Cl.
*H01M 4/02* (2006.01)

(52) U.S. Cl.
USPC .......................................... 429/209; 429/224

(58) Field of Classification Search
USPC .......................................................... 429/224
See application file for complete search history.

(56) References Cited

U.S. PATENT DOCUMENTS

| | | | |
|---|---|---|---|
| 3,237,078 A | 2/1966 | Mallory |
| 3,393,355 A | 7/1968 | Whoriskey et al. |
| 4,040,410 A | 8/1977 | Libowitz |
| 4,049,877 A | 9/1977 | Sailant et al. |
| 4,092,464 A | 5/1978 | Dey et al. |
| 4,098,958 A | 7/1978 | Bettman |
| 4,303,877 A | 12/1981 | Meinhold |
| 4,422,500 A | 12/1983 | Nishizaki et al. |
| 4,523,635 A | 6/1985 | Nishizaki et al. |
| 4,562,511 A | 12/1985 | Nishino et al. |
| 4,614,905 A | 9/1986 | Petersson et al. |
| 4,654,281 A | 3/1987 | Anderman et al. |
| 4,677,038 A | 6/1987 | Salomon |
| 4,692,390 A | 9/1987 | Roy |
| 4,719,401 A | 1/1988 | Altmejd |
| 4,781,029 A | 11/1988 | SerVaas |
| 4,818,638 A | 4/1989 | Roy |
| 5,139,895 A | 8/1992 | Roy et al. |
| 5,270,635 A | 12/1993 | Hoffman et al. |
| 5,291,116 A | 3/1994 | Feldstein |
| 5,306,577 A | 4/1994 | Sprouse |
| 5,314,765 A | 5/1994 | Bates |
| 5,336,573 A | 8/1994 | Zuckerbrod et al. |

(Continued)

FOREIGN PATENT DOCUMENTS

| | | |
|---|---|---|
| EP | 0 168 062 | 12/1981 |
| EP | 0 055 855 | 7/1982 |
| EP | 0 071 271 | 2/1983 |
| EP | 0 168 062 | 1/1986 |

OTHER PUBLICATIONS

Fragnaud et al.; Characterization of sprayed and sputter deposited LiCoO2 thin films for rechargeable microbatteries; (Journal of Power Sources 63 (1996) pp. 187-191).

(Continued)

*Primary Examiner* — Ula C Ruddock
*Assistant Examiner* — Jacob Marks
(74) *Attorney, Agent, or Firm* — Baker Donelson; Dorian B. Kennedy

(57) ABSTRACT

A regenerative ion exchange fuel cell having an anode, a metal ion conductor coupled to the anode, an aqueous electrolyte solution positioned adjacent the metal ion conductor, a proton conductor mounted adjacent the aqueous electrolyte solution opposite the metal ion conductor, a cathode positioned adjacent the proton conductor opposite the aqueous electrolyte solution, and a cathode current collector associated with the cathode.

4 Claims, 7 Drawing Sheets

(56) References Cited

U.S. PATENT DOCUMENTS

| | | |
|---|---|---|
| 5,338,625 A | 8/1994 | Bates et al. |
| 5,362,581 A | 11/1994 | Chang et al. |
| 5,387,857 A | 2/1995 | Honda et al. |
| 5,436,091 A | 7/1995 | Shackle et al. |
| 5,445,906 A | 8/1995 | Hobson et al. |
| 5,455,126 A | 10/1995 | Bates et al. |
| 5,498,489 A | 3/1996 | Dasgupta et al. |
| 5,512,147 A | 4/1996 | Bates et al. |
| 5,532,074 A | 7/1996 | Golben |
| 5,540,741 A | 7/1996 | Gozdz et al. |
| 5,547,782 A | 8/1996 | Dasgupta et al. |
| 5,561,004 A | 10/1996 | Bates et al. |
| 5,567,210 A | 10/1996 | Bates et al. |
| 5,569,520 A | 10/1996 | Bates |
| 5,571,634 A | 11/1996 | Gozdz et al. |
| 5,584,893 A | 12/1996 | Mitchell |
| 5,588,971 A | 12/1996 | Fauteux et al. |
| 5,591,544 A | 1/1997 | Fauteux et al. |
| 5,597,659 A | 1/1997 | Morigaki et al. |
| 5,597,660 A | 1/1997 | Bates et al. |
| 5,612,152 A | 3/1997 | Bates |
| 5,654,084 A | 8/1997 | Egert |
| 5,672,438 A * | 9/1997 | Banerjee et al. ............... 429/33 |
| 5,778,515 A | 7/1998 | Menon |
| 5,783,928 A | 7/1998 | Okamura |
| 5,811,205 A | 9/1998 | Andrieu et al. |
| 5,821,733 A | 10/1998 | Turnbull |
| 5,928,436 A | 7/1999 | Borkowski et al. |
| 6,001,139 A | 12/1999 | Asanuma et al. |
| 6,033,796 A | 3/2000 | Baji |
| 6,709,778 B2 | 3/2004 | Johnson |
| 6,737,180 B2 | 5/2004 | Johnson |
| 2004/0197641 A1 * | 10/2004 | Visco et al. ................... 429/137 |

OTHER PUBLICATIONS

Wang et al.; Characterization of Thin-Film Rechargeable Lithium Batteries with Lithium Cobalt Oxide Cathodes; (J. Electrochem. Soc., vol. 143, No. 10, Oct. 1996, pp. 3203-3213).

Fragnaud et al.; Thin-film cathodes for secondary lithium batteries; Journal of Power Sources 54 (1995) no month pp. 362-366.

Kenny et al.; The preparation and characterization of lithium cobalt oxide thin films by LPCVD; Materials Research Society vol. 415 (1996) no month pp. 213-217.

Schoonman et al.; Thin film solid electrodes for rechargeable lithium-ion batteries; Journal of Power Sources 68 (1997) no month pp. 65-68.

Chen et al.; Fabrication of LiCoO2 thin film cathodes for rechargeable lithium better by electrostatic spray pyrolysis; Solid State Ionics 80 (1995) no month pp. 1-4.

Chen et al.; Unique porous LiCoO2 thin layers prepared by electrostatic spray deposition; Journal of Materials Science 31 (1996) no month pp. 5437-5442.

Cole, Terry; Thermoelectric Energy Conversion with Solid Electrolytes; Science vol. 221 Sep. 2, 1983 pp. 915-920.

Feldman et al.; Heat pumps using organometallic liquid absorbents; AES-vol. 38, 1998 no month pp. 403-407.

Oxidation-Reduction Reactions; pp. 417-420.

* cited by examiner

REGENERATIVE ION EXCHANGE FUEL CELL

REFERENCE TO RELATED APPLICATIONS

This is a continuation-in-part of U.S. Patent Application Ser. No. 60/602,579 filed Aug. 18, 2004.

TECHNICAL FIELD

This invention relates to ion exchange fuel cells.

BACKGROUND OF THE INVENTION

The performance of conventional lithium battery systems is limited because they must include cathode materials that constrain the energy storage capacity of these cells on a per unit volume and mass basis. Typically, cathode materials include inorganic or organic compounds such as manganese oxide, vanadium oxide, lithium cobalt oxide and $(CF)_n$. Although lithium has the highest columbic capacity, most available cathode materials have specific capacities that are less than 200 mAh/g. Metal/oxygen batteries offer high performance because cathode active materials are not stored in the battery. Oxygen from the environment is reduce at a catalytic air electrode surface forming either an oxide or peroxide ion that then reacts with cationic species in the electrolyte. The oxygen content of the battery accumulates as the battery discharges.

Accordingly, it is seen that a need exists for a system that provides regenerative energy source without a very large mass. It is to the provision of such therefore that the present invention is primarily directed.

SUMMARY OF THE INVENTION

In a preferred form of the invention a regenerative ion exchange fuel cell having an anode, a metal ion conductor coupled to the anode, an aqueous electrolyte solution positioned adjacent the metal ion conductor, a proton conductor mounted adjacent the aqueous electrolyte solution opposite the metal ion conductor, a cathode positioned adjacent the proton conductor opposite the aqueous electrolyte solution, and a cathode current collector associated with the cathode.

DETAILED DESCRIPTION

Figure 1:
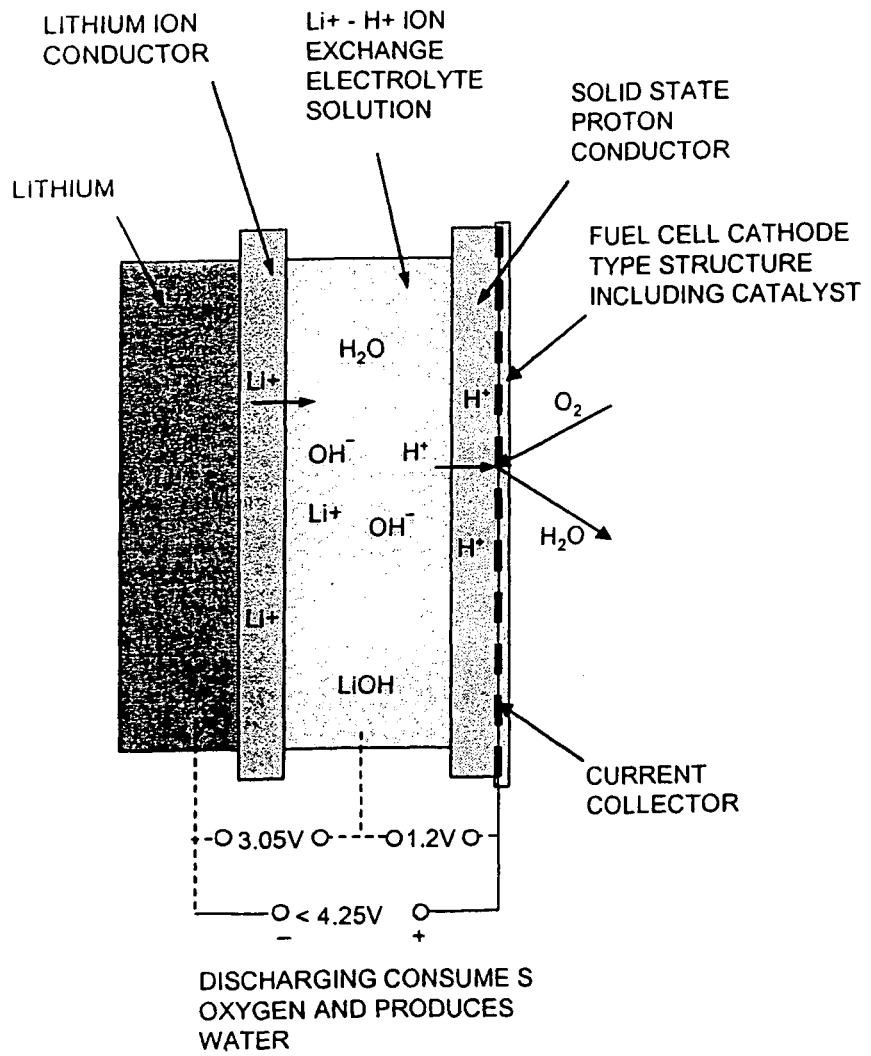
FIG. 1 is a schematic view of a regenerative ion exchange fuel cell embodying principles of the invention in a preferred form, shown during discharge phase.
Figure 2:
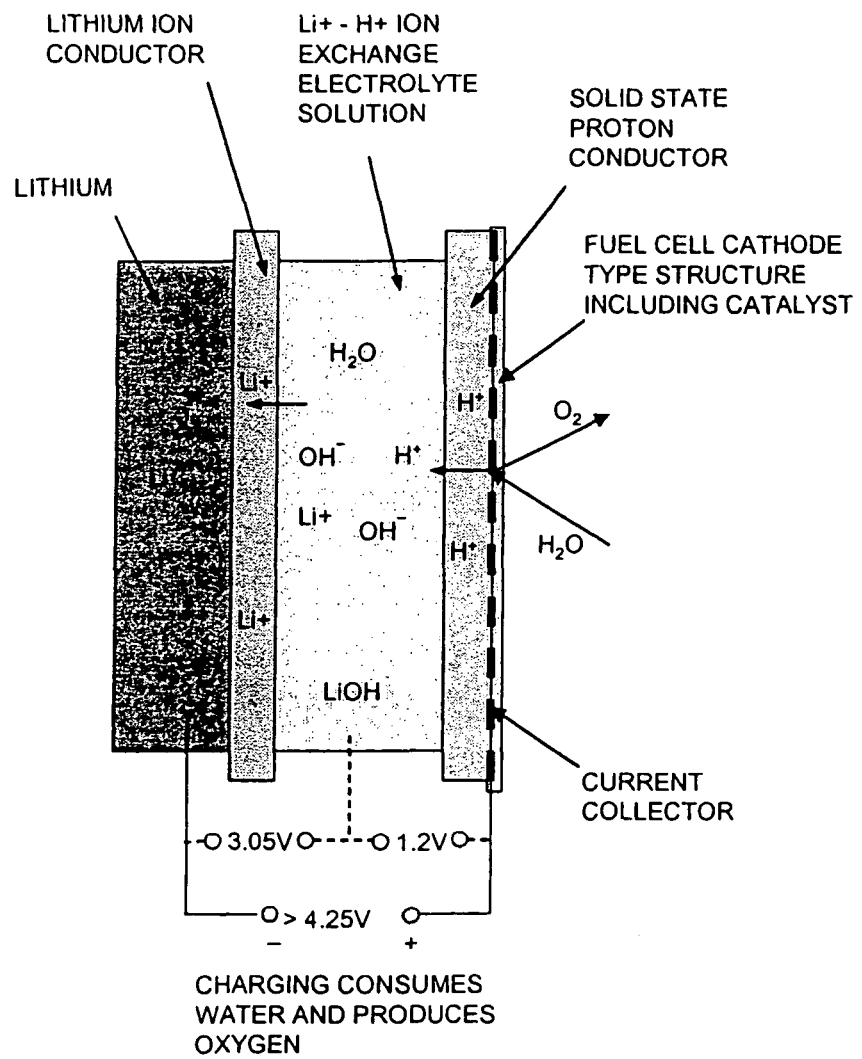
FIG. 2 is a schematic view of the regenerative ion exchange fuel cell of FIG. 1 shown in a recharge phase.

The explosive energy potential produced by this cell in the form of accumulated hydrogen and oxygen suggests that a more optimal cell design may be possible that could have even higher energy storage potential. One could use a fuel cell to generate electrical energy using the hydrogen and oxygen; however, the associated tanks and gas transport requirements would have an overall degrading impact on energy density. However, if this energy can be harvested efficiently, it represents a further energy gain in the basic battery system. FIGS. 1 and 2 suggest the general structure of such a combined cell, indicating the required layers and transport processes for a functional cell. The proposed system shown in FIGS. 1 and 2 indicate how the energy of the hydrogen can be simultaneously harvested resulting in a safe reversible lithium battery with high energy density. The actual cell may require additional layers for material compatibility or structural reasons.

The key to this new approach is a shared ion exchange medium, possibly aqueous, but not limited to water, which allows a transfer of charge carrier species from that of $Li^+$ to $H^+$ Lithium metal at the anode converts to lithium ions ($Li^+$) and electrons. The lithium ions are transported through a lithium electrolyte material to react in an aqueous intermediary ion exchange electrolyte resulting in the formation of LiOH and protons as shown previously in Equation 1. The resulting protons are transported from the ion exchange medium and on through a third electrolyte layer (proton conducting only) to react with oxygen producing water and additional energy. The overall by-products of this process are LiOH and water. To reverse the reaction, an applied voltage splits water at the cathode of the proton-conducting electrolyte. Protons transported to the intermediary electrolyte cause polarization at the surface of the lithium electrolyte resulting in the dissociation of LiOH from solution with lithium ions being driven back to the anode.

Dependent upon the intermediate species formed, the cell reactions may include the following reactions:

$$Li(s) => Li^+(aq) + e^- \quad -3.05 \text{ Volts}$$

$$2H_2O(l) + 2e^- => H_2(g) + 2OH^-(aq) \quad -0.83 \text{ Volts}$$

$$2H^+ + 2e^- => H_2(g) \quad 0.00 \text{ Volts}$$

$$O_2(g) + 4H^+(aq) + 4e^- => 2H_2O(l) \quad 1.23 \text{ Volts}$$

as observed by Visco[5] et al., who attained a voltage of 3.05 volts for the lithium water cell alone when the water was saturated with LiOH or LiCl/HCl, indicating the ability to bypass the losses in the $H_2O$ to $OH + H^+$ reaction. Additionally, the charge transfer to protons and harvesting of protons to create an additional 1.23 volts yields an overall cell voltage of up to 4.28 volts.

Figure 3:
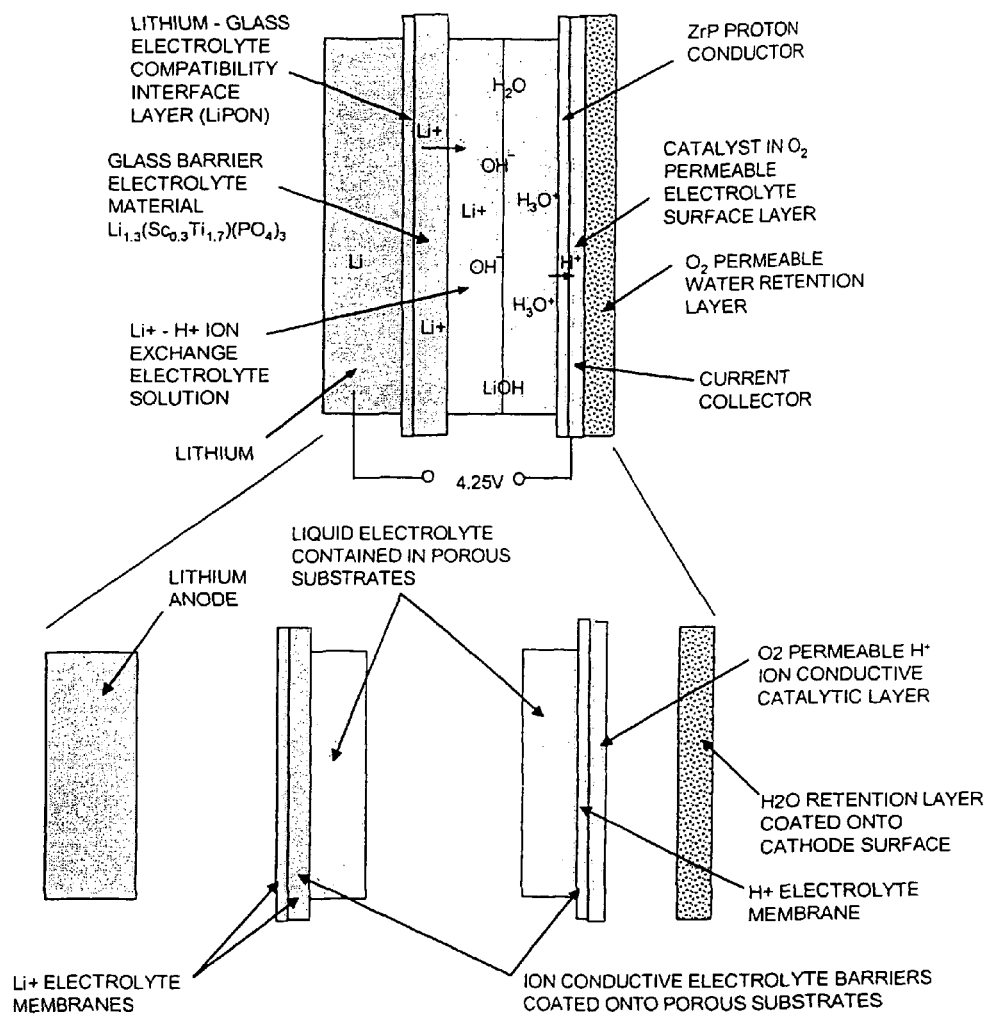
FIG. 3 is a schematic view of the regenerative ion exchange fuel cell in another preferred embodiment.

A practical approach for constructing the proposed cell is illustrated in FIG. 3. Ridged substrates are used to provide structural support for the thin, solid $Li^+$ and $H^+$ electrolyte barrier layers. The $H^+$ electrolyte glass is on the order of 1 to 5 um thick and therefore does not have sufficient thickness for use as a stand alone film. This application requires the electrolyte to be a barrier to the electrolyte solution to prevent vaporization/dry out, and prevent lithium ion transport to the surface of the cathode. Lithium-oxygen reactions at the cathodic surface of the proton membrane would form solid $Li_2O$, which could act as a barrier to oxygen limiting further reactions, thereby shutting down the cell. A catalyst layer with an embedded current collector will be applied to the surface of the proton conductive layer to form the cathode side of a fuel cell type membrane electrode assembly (MEA). The outer surface of the MEA is to be covered by an oxygen permeable hydroscopic polymer material such as that used for extended wear contact lenses. This coating will retain water produced during operation of the cell at the location where it is generated and later required for regeneration. With this approach, separate plumbing associated with a complex water management system is not necessary.

On the other side, a $Li^+$ electrolyte, that conducts only lithium ions and acts as a protective barrier, prevents the aqueous electrolyte from contacting and reacting with the lithium metal anode. Considering the lithium ion conductivity of the glass selected for this application, $Li_{1.3}(Sc_{0.3}Ti_{1.7})(PO_4)_3$, it is anticipated that this layer will be 10 to S0 um thick. A 0.1 to 1.0 um coating of LIPON electrolyte will be applied between the glass barrier and the lithium anode. The LiPON coating is necessary because direct contact between lithium and the selected glass barrier material would otherwise form an unstable interface.

Scalability of Lithium Air Batteries

Table 3 shows representative battery requirements for a High Altitude Airship. Considering a lO, 600 lb weight allocation for the battery and an energy storage requirement of 675 kWhr, the specific energy is 140 Wh/kg, which is consistent with state of the art lithium polymer battery technology. The technology proposed herein will eventually provide this level of energy storage capability with close to an order of magnitude reduction in weight. An additional goal is to provide a battery that will be capable of extended stand by shelf life and at least 300 charge discharge cycles at 80 percent retention of original capacity.

TABLE 3

Representative Performance Parameters for HAA Battery

| External Temperature | −80° C. |
|---|---|
| Cycle Life | 300 |
| Operational Periods | 10 to 16 his |
| Storage Life | 1 yr |
| Operating Life | 2 yrs |
| Depth of Discharge Capability (DoD) | Up to 90% |
| Max Weight | 6500 lbs |

Energy Capacity 675 kW-hrs
Current Capacity 2.5 kAh
Operating Voltage=270 VDC
Power Under Standby Operations 12.5 kW
Nominal Operating Power 37.5 kW
Peak Operating Power 62.5 kW
Peak Out Put Current 231 A The performance objectives will be achieved using a modular battery configuration. As presented in Table 4, each module will be self-contained including oxygen. The design is based on the use of 83 cells configured as panels within a given module. The module will have a total open circuit voltage of 300V and 270V under load. Calculations are included below which show that the described structure would be able to meet electrical output power requirements in terms of IR losses associated with current collectors and busses within the battery. The battery modules will be electrically connected in parallel for a total peak output capability of 54 kW (@200 A). Oxygen diffusion within the cathode and ionic conductivity polarization losses will be addressed in detail over the course of the proposed project.

The proposed design is based on the use of 25 battery modules connected in parallel. Each of the 25 modules will be capable of delivering 1OA with an energy storage capacity of 27 kWhr. The total energy storage capability for the 25 modules is 675 kWh. A cell voltage allocation of 1V is assigned for internal battery losses under peak operating current conditions. Given a cell open circuit voltage of 4.25V, the 1V internal loss allocation results in a net cell output voltage of 3.25V at peak current. The internal impedance loss allocation is distributed as follows: 1) 0.4V for $H_2$—$O_2$ cathode activation polarization, and 2) 0.6V for internal resistance and current collector buss losses. The required total peak current of 231 A and the use of 25 modules suggest that each module should be capable of supplying 9.25 A. An output requirement of 10 A is assumed for each module. To attain the desired 270V operation per module from cells with an anticipated output of 3.25V under peak load conditions suggests that 83 cells (270V/3.25 V/cell) connected in series within each module will be required to achieve the required operating voltage. The open circuit voltage for the 83 cells connected is 352V (83 cells×4.25V). To achieve the desired 27 kWh output, each cell must store 1OOAhr (27 kWh/270V).

Given that a nominal current density for rechargeable battery cells is in the range of 10 mA/cm², the 10 A per cell requirement can be achieved using a cell area of 1000 cm² (10 A/10 mA/cm²). Given a cell storage capacity of 1OOAhr and a surface area of 1000 cm², the required storage capacity is 0.1 Ah/cm² (1OOAhr/1000 cm²). A lithium thickness of 500 um is required to achieve this storage density.

Figure 4:
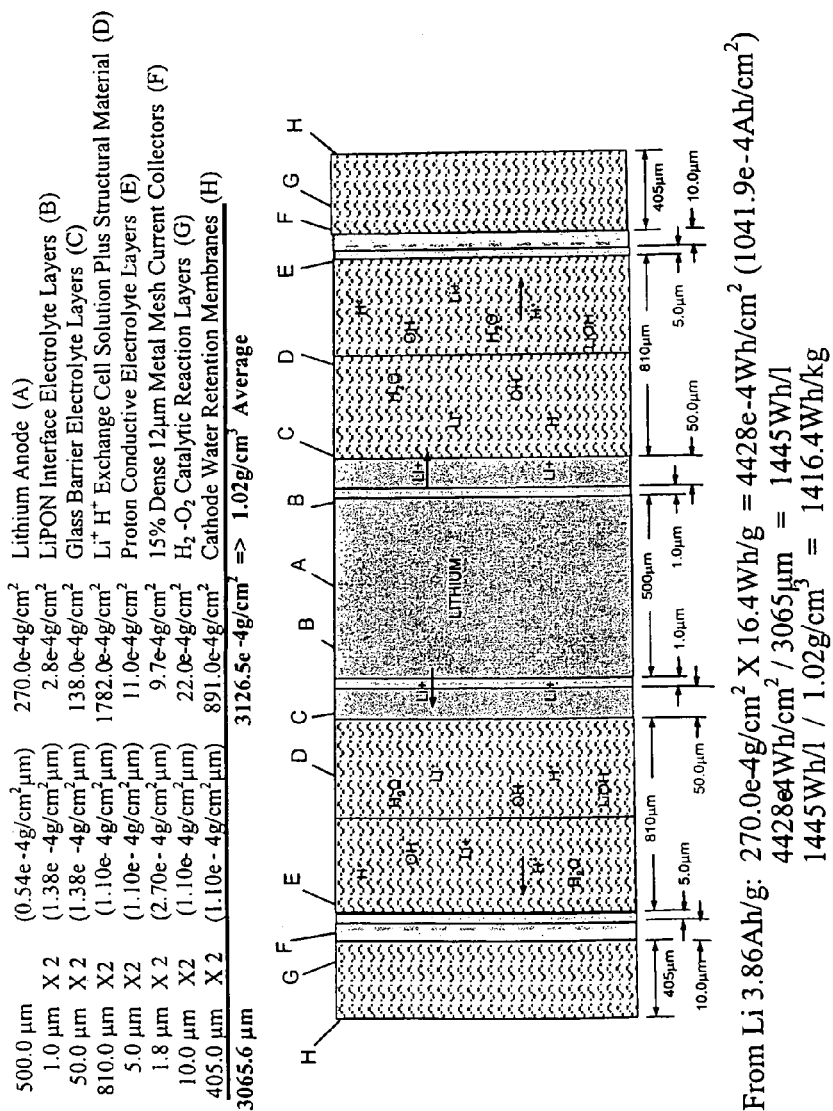
FIG. 4 is a schematic view of the regenerative ion exchange fuel cell in yet another preferred embodiment.

The battery module performance specifications presented in Tables 3 and 4 are based on the energy density calculation for the cell illustrated in FIG. 4. No design consideration is given for external power bus requirements and the conceptual design does not address mass allocations for the pressure containment vessels. The vessel weight required for $O_2$ containment would ultimately depend on operating pressure. Estimates below are based on a preliminary operating pressure of 200 psi.

TABLE 4

Total capacity for proposed HAA

| Number of Battery Modules | 25 modules |
|---|---|
| Individual Module Specifications: | |
| Peak Current Per Module | 10 A |
| Open Circuit Voltage | 352 VDC |
| Voltage at 10A | 270 VDC |
| Peak Power | 2.5 kW |
| Energy Storage Capacity | 27 kWh |
| 02 Containment Pressure | 200 psi |
| 02 Volume @ 200 psi | 0.18 m³ (6 ft³) |

Equation 7 gives the molecular balance reactions for the proposed ion exchange cell. In the stated reaction, one mole of water is required in the exchange electrolyte for each mole of lithium. LiOH formation in the solution should result in precipitation, which is anticipated to tie up another mole of water as $LiOH*H_2O$. In addition, the reaction of protons with oxygen at the cathodic side of the proton electrolyte will generate a further ½ mole of water per mole of lithium. The total water required then is 2.5 moles per mole of lithium or approximately 6.5 g of water per gram of lithium. Similarly, this yields a volume of 3.5 cc of water per cubic centimeter of lithium. Assuming that excess lithium is required in the anode for electrical continuity, similar excess quantities of water would be available for maintaining the aqueous electrolyte throughout battery cycling.

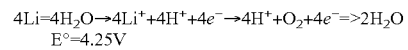

$$4Li=4H_2O \rightarrow 4Li^+ +4H^+ +4e^- \rightarrow 4H^+ +O_2+4e^- => 2H_2O$$
$$E°=4.25V$$

Figure 5:
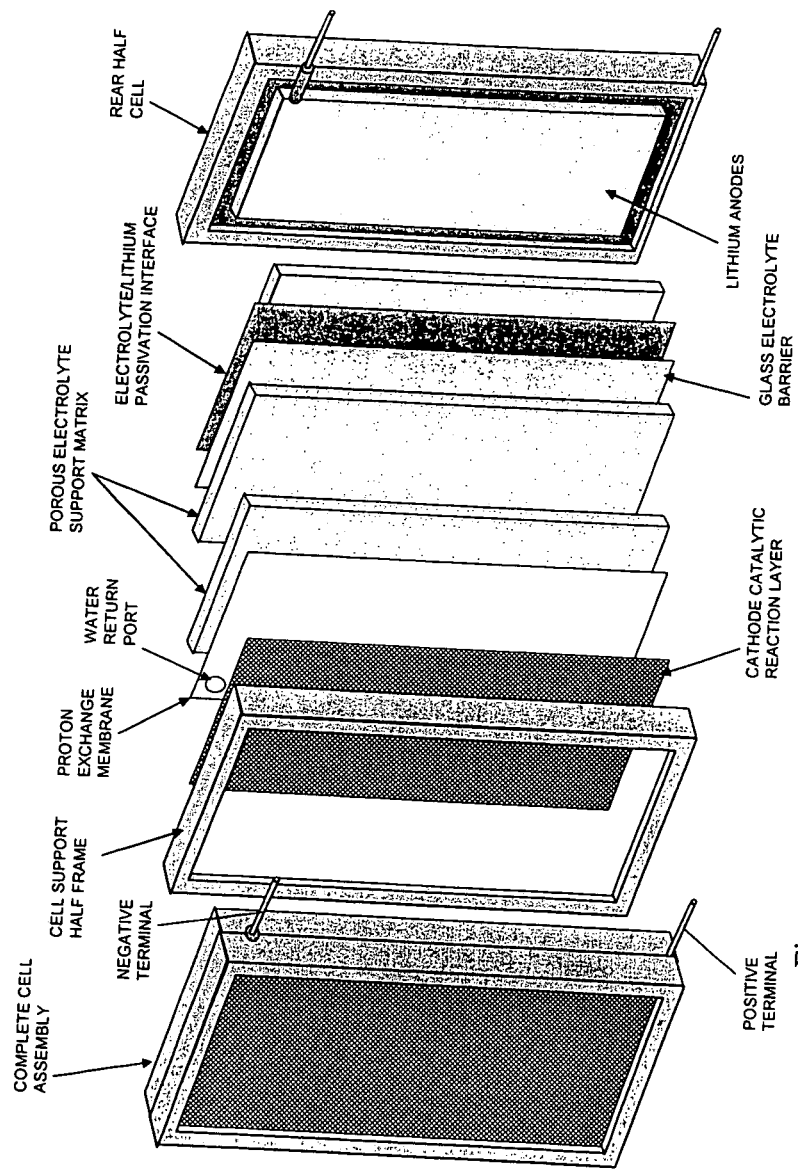
FIG. 5 is an exploded view of the regenerative ion exchange fuel cell of FIG. 4.

FIG. 4 shows the targeted configuration for a HAA lithium oxygen cell. The cell functions as a lithium/hydrogen ion exchange fuel cell. It uses a lithium metal anode protected by a glass barrier electrolyte. The electrolyte barrier prevents moisture from attacking the lithium while at the same time providing for lithium ion transport. The cell includes an aqueous lithium/hydrogen ion exchange layer. As lithium ions enter this layer during discharge, they displace hydrogen ions from water molecules elevating the level of LiOH in the solution. The displaced hydrogen ions are conducted through the proton conductive membrane to the cathode current collector where it gains an electron and reacts with oxygen forming water at the exterior surface of the cell. The data included in FIG. 4 indicates that a power density of 1445 Wh/l can be attained with a specific energy of 1416.4 Wh/kg. Cells are to be constructed into panels as shown in FIG. 5.

Figure 6:
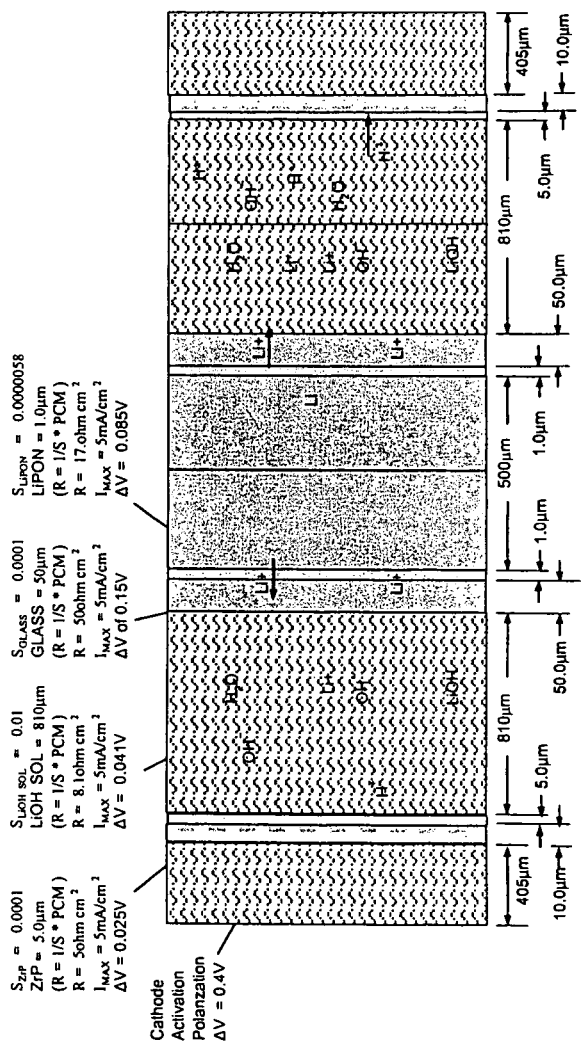
FIG. 6 is a schematic view of a regenerative ion exchange fuel cell in yet another preferred embodiment.
Figure 7:
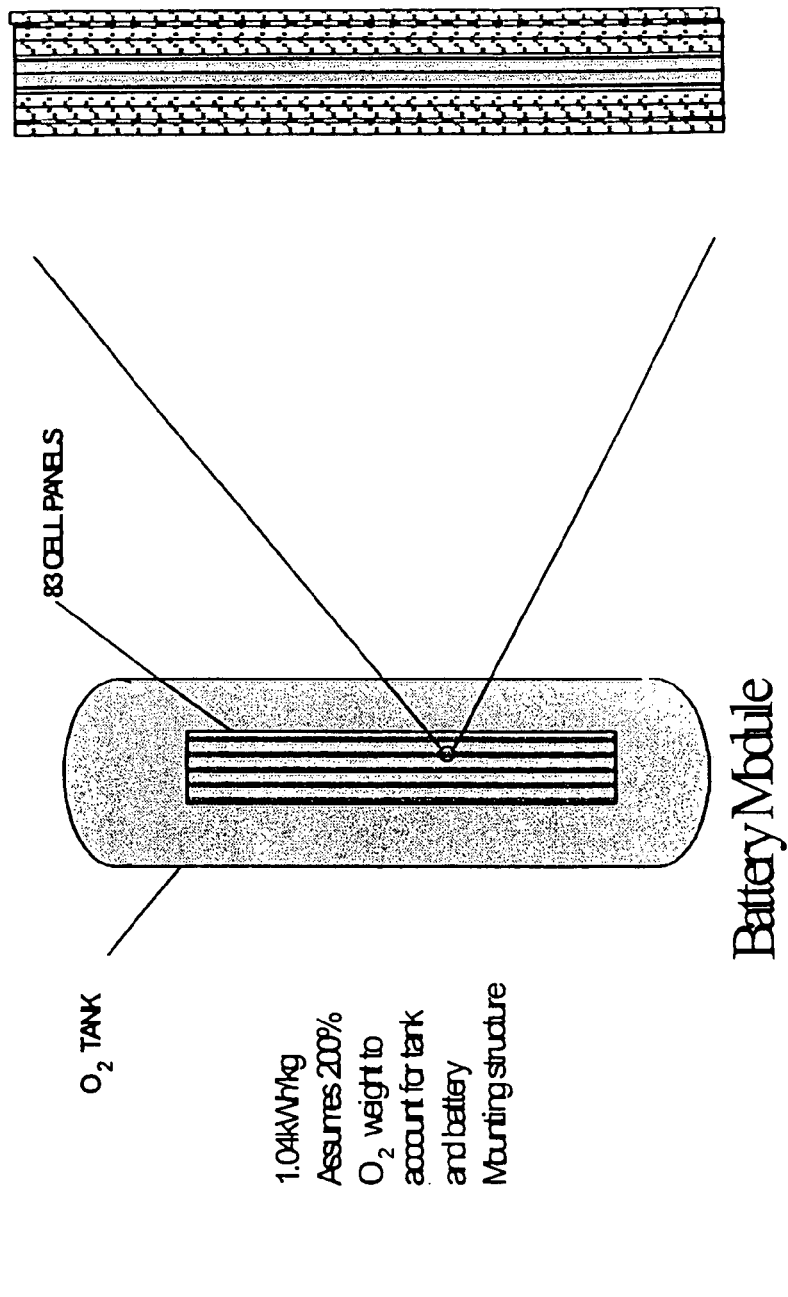
FIG. 7 is a schematic view of a regenerative ion exchange fuel cell shown in an oxygen tank.

Electrical losses anticipated in individual components of such a system are shown in FIG. 6. These losses are calculated based on the anticipated thickness and resistivity for each system component. The total voltage drop anticipated is 0.7V during cell operation. This data along with the data from FIG. 4 were used as a basis for estimating the size, surface area, power density and weight requirement for the individual cell panels of a large scale HAA battery. These values are presented in Table 5 and show the power density for modules including associated oxygen/water as 1.01 kWh/kg. FIG. 7 represents a schematic for the assembly of panels into the battery module.

While this invention has been described in detail with particular reference to the preferred embodiments thereof, it should be understood that many modifications, additions and deletions, in addition to those expressly recited, may be made thereto without departure from the spirit and scope of invention as set forth in the following claims.

The invention claimed is:

1. An ion exchange fuel cell comprising:
   an anode;
   a metal ion conductor coupled in physical contact with said anode;
   an electrochemically active aqueous electrolyte solution positioned in physical contact with said metal ion conductor;
   a proton conductor mounted in physical contact with said aqueous electrolyte solution opposite said metal ion conductor;
   an air cathode positioned in physical contact with said proton conductor opposite said aqueous electrolyte solution; and
   a cathode current collector in physical contact with said cathode.

2. The ion exchange fuel cell of claim 1 wherein said anode is a lithium metal.

3. The ion exchange fuel cell of claim 1 wherein said cathode includes a catalyst.

4. The ion exchange fuel cell of claim 1 wherein said fuel cell is regenerative.

* * * * *